United States Patent
Yamada et al.

(10) Patent No.: US 8,111,412 B2
(45) Date of Patent: Feb. 7, 2012

(54) PRINTER, PRINTING METHOD AND PRINTING PROGRAM FOR COMPENSATING FOR A LOSS OF A PART OF A RECEIVED IMAGE

(75) Inventors: Shinya Yamada, Asaka (JP); Satoshi Ueda, Asaka (JP)

(73) Assignee: Fujifilm Corporation, Tokyo (JP)

( * ) Notice: Subject to any disclaimer, the term of this patent is extended or adjusted under 35 U.S.C. 154(b) by 1325 days.

(21) Appl. No.: 11/699,470

(22) Filed: Jan. 30, 2007

(65) Prior Publication Data

US 2007/0177205 A1   Aug. 2, 2007

(30) Foreign Application Priority Data

Jan. 31, 2006   (JP) .................................. 2006-022965

(51) Int. Cl.
*G06F 3/12*   (2006.01)
(52) U.S. Cl. ...................... 358/1.13; 358/1.14; 358/1.15; 358/453; 382/232; 725/115; 714/42; 709/231
(58) Field of Classification Search ................. 358/1.13, 358/1.14, 1.15, 453; 375/240.27; 382/232; 709/231; 714/42; 725/115
See application file for complete search history.

(56) References Cited

U.S. PATENT DOCUMENTS

| | | | | |
|---|---|---|---|---|
| 3,629,850 A | * | 12/1971 | Clark et al. | 712/233 |
| 6,608,933 B1 | * | 8/2003 | Dowell et al. | 382/232 |
| 6,996,623 B1 | * | 2/2006 | Kawano et al. | 709/231 |
| 2004/0012806 A1 | * | 1/2004 | Murata | 358/1.14 |
| 2004/0223185 A1 | * | 11/2004 | Yamada et al. | 358/1.15 |
| 2005/0105557 A1 | * | 5/2005 | Yamane et al. | 370/474 |
| 2006/0143542 A1 | * | 6/2006 | Jones et al. | 714/42 |

FOREIGN PATENT DOCUMENTS

JP   2002-200812 A   7/2002

* cited by examiner

*Primary Examiner* — King Poon
*Assistant Examiner* — David S Cammack
(74) *Attorney, Agent, or Firm* — Birch, Stewart, Kolasch & Birch, LLP

(57) ABSTRACT

According to a printer of the present invention, the displaying unit creates a print image of the image received by the receiving unit and displays a preview of the print image when the loss detecting unit detects the lost part of the image, and the displaying unit creates a print image of an image obtained as a result of the trimming and displays a preview of the print image when the trimming unit trims the image, and the printing unit prints an image obtained as a result of the trimming by the trimming unit. Consequently, if a user failed in communicating an image as the user did not set an external communication terminal to an appropriate place and the image has been lost, the user can display a preview of the image by removing the lost part by trimming and display the lost part by a preview, check the trimmed image and print it.

22 Claims, 10 Drawing Sheets

PRINTER, PRINTING METHOD AND PRINTING PROGRAM FOR COMPENSATING FOR A LOSS OF A PART OF A RECEIVED IMAGE

BACKGROUND OF THE INVENTION

1. Field of the Invention

The present invention relates to a technique for receiving image data from an external appliance such as a cellular phone and for printing the image data.

2. Description of the Related Art

The technique of Japanese Patent Application Laid-Open No. 2002-200812 is an invention intending to provide a system for enabling a user to sufficiently check a print image (preview) of print data requested by a cellular terminal using a printing apparatus. The invention is characterized by providing a display device for a printing apparatus and allows the user to execute a print instruction after checking a print image displayed on the display device.

If image data is not correctly received from an external appliance, the invention described in Japanese Patent Application Laid-Open No. 2002-200812 would not display a preview. As a receiving printer usually detects an error in data by, for example, performing a parity check on a received packet in data communication, received data may not be lost in many cases. These days, various new protocols that do not perform a parity check in order to speed up a communication have been developed. If image data is communicated in such a protocol, data may be easily lost and image data is highly likely to be discarded. As a result, the user needs to repeat an operation for sending data again and the user wastes a time for printing. If the number of times to send image data is limited in order to protect copyright of the data to be sent, the user cannot resend the data if the user failed in sending the data. In such a case, a failure by a user in sending an image could not be recovered.

SUMMARY OF THE INVENTION

The present invention is made in view of the problem and intended to enable image data that is partially lost, as it has not correctly received due to a communication failure, to be printed for the correctly received part.

The present invention relates to a printer including a receiving unit for receiving an image from an external communication terminal, a display unit for creating a print image of the image received by the receiving unit and displaying a preview of the print image, a printing unit for printing the image received by the receiving unit, a loss detecting unit for detecting a loss in the image received by the receiving unit, and a trimming unit for trimming the image so that a lost part of the image is removed when the loss detecting unit detects a lost part of the image.

In such a printer, the displaying unit creates a print image of the image received by the receiving unit and displays a preview of the print image when the loss detecting unit detects the lost part of the image, and the displaying unit creates a print image of an image obtained as a result of the trimming and displays a preview of the print image when the trimming unit trims the image, and the printing unit prints the image obtained as a result of the trimming by the trimming unit.

In this manner, if a user failed in communicating an image as the user did not set an external communication terminal to an appropriate place and the image has been lost, the user can display a preview of the image by removing the lost part by trimming and display the lost part by a preview, check the trimmed image and print it.

The printer may further include an instruction inputting unit for accepting input of an instruction by a user.

The trimming unit may trim the image in the instructed range when an instruction for the trimming unit to execute the trimming and an instruction indicating a range of trimming are inputted in the instruction inputting unit, and the printing unit may print the image obtained as a result of the trimming by the trimming unit when an instruction for printing the image obtained as a result of the trimming of the image by the trimming unit is inputted in an instruction inputting unit.

Alternatively, the printing unit may print the image received by the receiving unit when an instruction for not executing the trimming by the trimming unit is inputted in the instruction inputting unit and an instruction for printing the image received by the receiving unit is inputted in the instruction inputting unit.

Alternatively, the printing unit may discard the image received by the receiving unit when an instruction for not executing the trimming by the trimming unit is inputted in the instruction inputting unit and an instruction for not printing the image received by the receiving unit is inputted in the instruction inputting unit.

That is to say, the user can arbitrarily determine which range should be trimmed, whether or not to print the image without trimming, or neither the trimming nor printing should be performed by viewing a preview display of an image with a loss. The user may arbitrarily determine whether or not to print the trimmed image by viewing a preview of the trimmed image.

The printer may further include an informing unit for informing the presence of a loss in the image when the loss detecting unit detects the loss in the image.

A specific aspect of the information of the presence of a loss in the image from the informing unit includes at least one of lighting or flashing of a light-emitting device, displaying of a predetermined message or a predetermined icon by the display device, and playing a predetermined voice by a voice playing device.

The loss detecting unit may detect a loss in the image obtained as a result of trimming by the trimming unit, and the informing unit may inform the absence of a loss in the image when the loss detecting unit does not detect the loss in the image obtained as a result of the trimming.

The information on the absence of a loss in the image from the informing unit includes at least one of: stopping of lighting or flashing of a lighting-emitting device, displaying of a predetermined message or a predetermined icon by the display device, and playing of a predetermined voice by the voice playing device.

The specific aspect of the informing unit may be any aspect if only it is a device which informs a user to recognize the presence/absence of a loss in an image.

The present invention relates to a printing method used in a printer including a receiving unit for receiving an image from an external communication terminal, a displaying unit for creating a print image of the image received by the receiving unit and displaying a preview of the print image, a printing unit for printing the image received by the receiving unit, a loss detecting unit for detecting a loss in the image received by the receiving unit, and a trimming unit for trimming the image so that a loss in the image is removed when the loss detecting unit detects a loss in the image.

The printing method includes the steps of: creating a print image of an image received by the receiving unit and displaying a preview of the image on the display unit when the loss detecting unit detects a loss in the image, creating a print image of an image obtained as a result of the trimming and displaying a preview of the image by the displaying unit when the trimming unit trims the image, and printing the image obtained as a result of trimming by the trimming unit.

The present invention relates to a printing program to be used in a printer including a receiving unit for receiving an image from an external communication terminal, a displaying unit for creating a print image of the image received by the receiving unit and displaying a preview of the print image, a printing unit for printing the image received by the receiving unit, a loss detecting unit for detecting a loss in the image received by the receiving unit, and a trimming unit for trimming the image so that a lost part in the image is removed when the loss detecting unit detects the loss in the image.

The printing program causes the printer to execute the steps of: creating a print image of an image received by the receiving unit and displaying a preview of the print image on the display unit when the loss detecting unit detects a loss in the image, creating a print image of the image obtained as a result of the trimming and displaying a preview of the print image on the display unit when the trimming unit trims the image, and printing an image obtained as a result of the trimming by the trimming unit by the printing unit.

The method including the steps and a program to cause a printer to execute the steps are also included in the present invention.

According to the present invention, even if an image fails to be communicated and an image has a loss as a result of, for example, an external communication terminal that has not been set to an appropriate place by the user, the lost part can be removed by trimming and a preview thereof can be displayed so that a user can print the image after checking the trimmed image.

DETAILED DESCRIPTION OF THE PREFERRED EMBODIMENTS

Preferred embodiment of the present invention will be described with reference to the attached drawings.

First Embodiment

Figure 1:
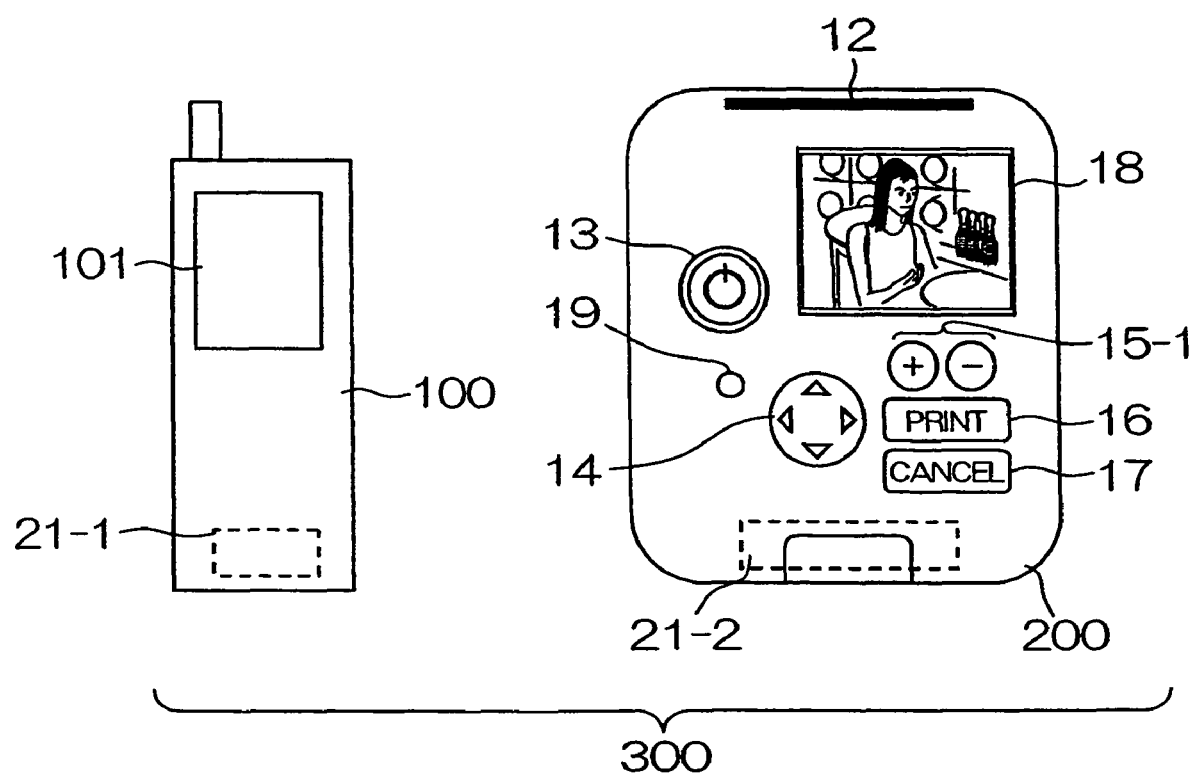
FIG. 1 is a diagram showing an appearance of a print system according to the first embodiment.

FIG. 1 is a diagram showing a configuration of a printer 200 and a print system 300 according to the preferred first embodiment of the present invention. The print system 300 has a cellular phone 100 and a printer 200 that receives image data sent from a communication interface (I/F) 21-1 of the cellular phone 100 by a communication I/F 21-2 and prints the image.

The cellular phone 100 has a communication I/F 21-1, a liquid crystal image displaying unit 101 that can display image data saved in a built-in memory (not shown) or a wearable memory card (not shown) and a communication unit (not shown) that enables calls and data communications by sending and receiving an electric waves.

A sheet-feeding slot (not shown) is provided for a bottom of an external surface of the printer 200, and a sheet-discharging slot 12 is provided for a side of the printer 200. When print data is printed, a photographic printing paper or a printing medium such as an instant film is discharged from the discharging slot 12.

On the top of the printer 200, a power button 13 for turning on/off the power supply of the printer 200, a direction key 14 for moving a trimming region of image data received from the cellular phone 100 vertically and horizontally, a zooming up/down button 15-1 for zooming up and down the trimming region, a print button 16 for printing the received image data, a cancel button 17 for canceling the printing, a display device 18 for displaying a preview of the received image data and a light-emitting device 19 including LEDs for informing a loss in the received print data.

Parts and circuits necessary for printing image data such as a photographic print head 57 or a print-controlling unit 56 is contained in the body of the printer 200, though they are not shown in FIG. 1. They may be referred to as a printer unit 20 below.

Figure 2:
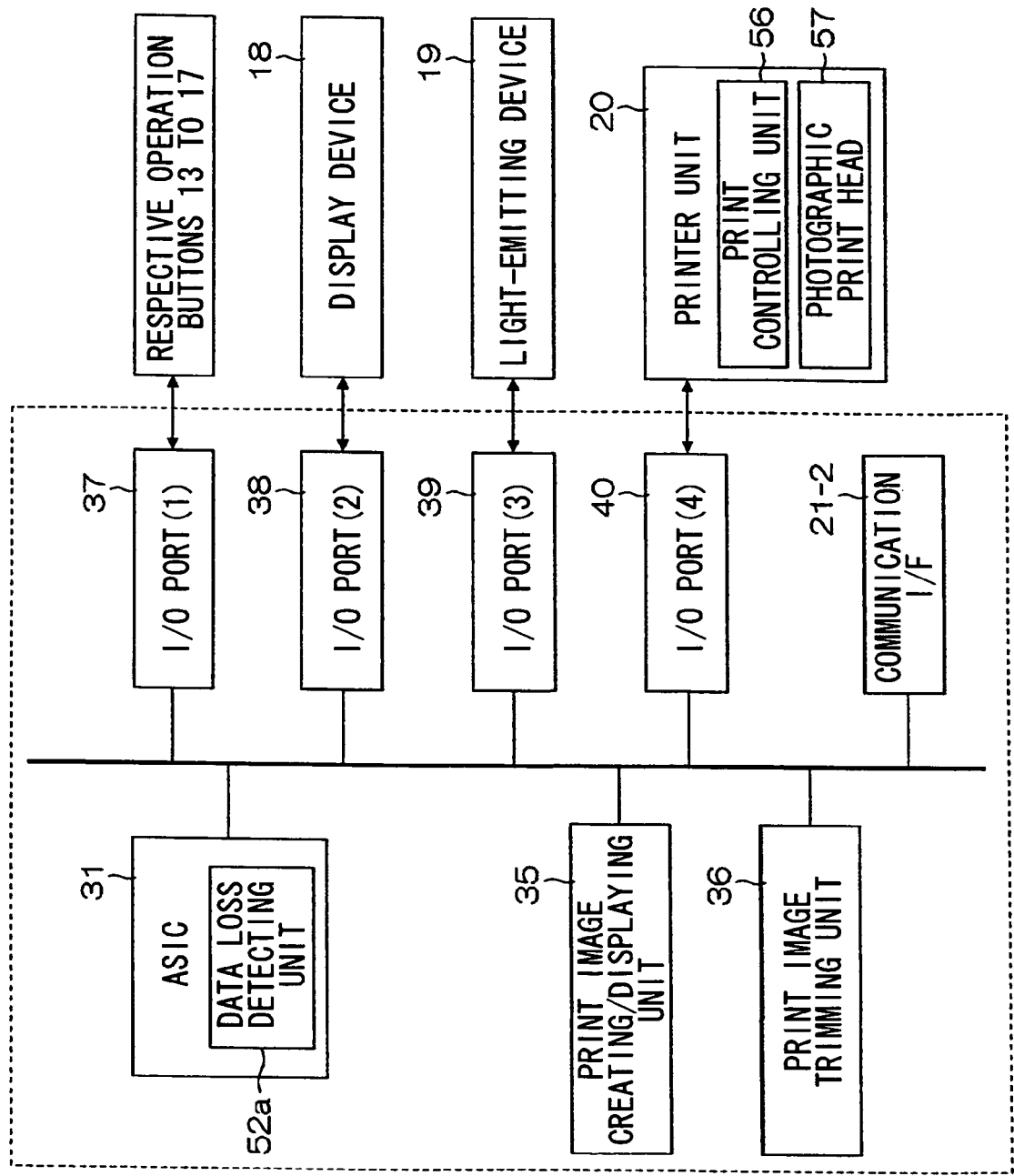
FIG. 2 is a block diagram of a printer.

FIG. 2 is a block diagram of a printer 200.

The printer 200 performs image processing on image data inputted via a communication I/F 21-2 connected with the cellular phone 100 and outputs the processed image data to a photographic print head 57 of the printer unit 20 to print the image. The printer 200 includes an ASIC 31, a print image creating/displaying unit 35, a print image trimming unit 36, various operation buttons 13 to 17 including the power button 13, the display device 18, the light-emitting device 19, the printer unit 20 including a print-controlling unit 56 and the photographic print head 57. The print data subject to the image processing at the ASIC 31 is outputted to the photographic print head 57.

The printer 200 has a print image creating/displaying unit 35 for creating an image of a print by image data inputted via the communication I/F 21-2 or image data trimmed by the print image trimming unit 36 (preview image) and display the image on the display device 18, and the print image trimming unit 36 for trimming the received image data based on a user instruction inputted via various operation buttons 13 to 17.

The printer 200 further includes a first I/O port 37 for accepting an input operation from the various operation buttons 13 to 17, a second I/O port 38 for transferring a preview image on the display device 18 such as a liquid crystal display, a third I/O port 39 for transmitting signals for controlling a light-emitting device 19, and a fourth I/O port 40 for transferring print data to the printer unit 20.

Figure 3:
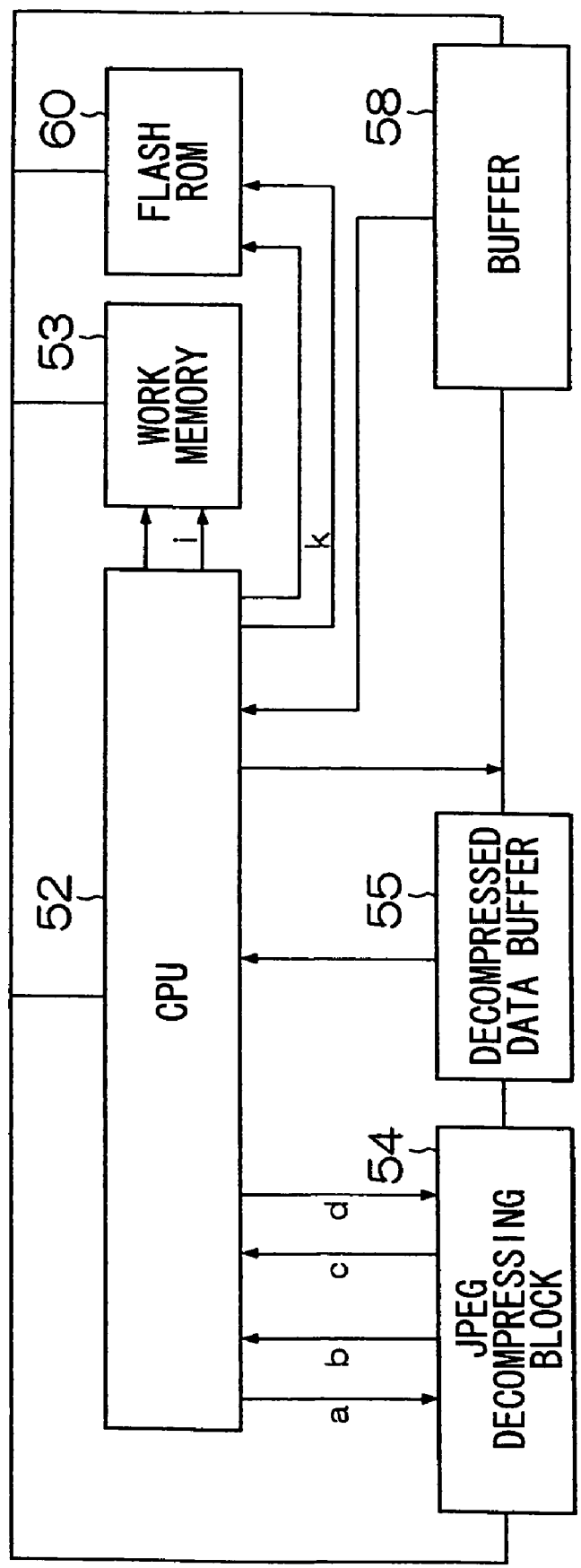
FIG. 3 is a block diagram of an ASIC of a printer.

Referring to FIG. 3, the ASIC 31 mainly includes a central processing unit (CPU) 52, a work memory 53, a JPEG decompressing block 54, and a decompressed data buffer 55.

The communication I/F 21-2 is a wireless interface such as the IrDA, the Bluetooth, a wireless LAN, a UWB (Ultra Wide Band), a USB (Universal Serial Bus) and a wireless USB. For simplifying the description, the communication I/Fs 21-1, 21-2 send and receive image data between the cellular phone 100 and the printer 200 by dividing the data into image packets of the minimum coding unit (MCU) to be described later by infrared communications. The present invention is particularly effective to the loss in an image caused by a communication failure of the wireless communication. The present invention is basically not relevant to the specific aspect of the communication device and can be applied to the case where the communication I/Fs 21-1 and 21-2 are a wired interface such as the IEEE 1394, the SCSI, the RS232C or the like.

The CPU 52 is for controlling over various circuits and performs analysis of data or an image, setting of necessary information to respective circuits based on the analysis result, JPEG compression by a software program, reading/writing control of data, and the like.

The work memory 53 functions as a working area of the CPU 52.

The JPEG decompressing block 54 includes a Huffman decoding unit, an inverse quantization unit (IQ unit) and an inverse discrete cosine transform unit (IDCT unit), and decompresses compressed data subject to the JPEG compression by the minimum coding unit (MCU) based on a resolution in a main-scanning/sub-scanning direction, the number of color components, sampling factors (SF) for each color, a quantization table for each color (IQNT), a Huffman coding defining table for each color (DHT) sent from the CPU 52. Thus, a DCT coefficient that is the compressed data inputted via the communication I/F 21-2 subject to Huffman decoding and quantized is generated, a DCT coefficient that is the generated and quantized DCT coefficient subject to inverse quantization at an inverse quantization unit is generated, and image data is generated by further subject to IDCT processing at the IDCT unit.

The decompressed data buffer 55 includes a double buffer for each color with an image data capacity for one block of n×n pixels (in this embodiment, 8×8 pixels) and stores the data decompressed at the JPEG decompressing block 54. The 8×8 pixels stored in the decompressed data buffer 55 are transferred to the buffer 58.

The buffer 58 temporally saves an outputted image (image data for a plurality of lines) to be printed out.

The print-controlling unit 56 has a 3D-LUT (three dimensional look-up table). When brightness data Y, color difference data Cb, Cr of the YCbCr displayed color system for each line in the sub-scanning direction of the printer from the buffer 58 are inputted, the print-controlling unit 56 converts the brightness data Y, the color difference data Cb, Cr into R, G, B data of RGB display color system by the 3D-LUT and performs image processing by an image processing parameter created by the CPU 52 on the R, G, B data and sends the data to the photographic print head 57.

The ROM 60 has a free space that can store a microcomputer program and can store compressed data of the outputted image in a desired image size (VGA) only for a frame.

Figure 4:
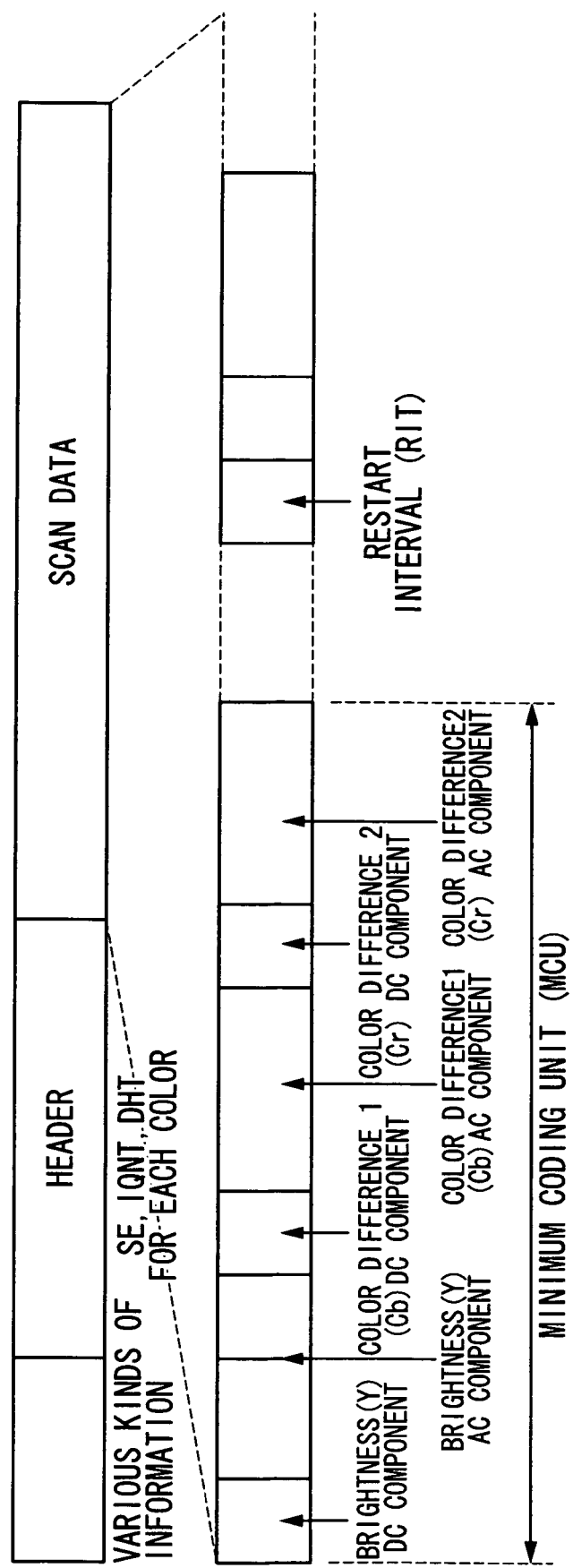
FIG. 4 is a diagram showing a structure of JPEG data.

Referring to FIG. 4, a data structure of the JPEG data will be described. As shown in FIG. 4, in the header part of the JPEG data, a resolution in a main-scanning/sub-scanning direction (image size), the number of color components, a sampling factor (SF) for each color, a color quantization table (IQNT) for each color, a Huffman coding defining table (DHT) for each color are recorded, followed by image data of the body of the JPEG data is compressed for each minimum coding unit (MCU) and recorded in order.

Figure 5A:
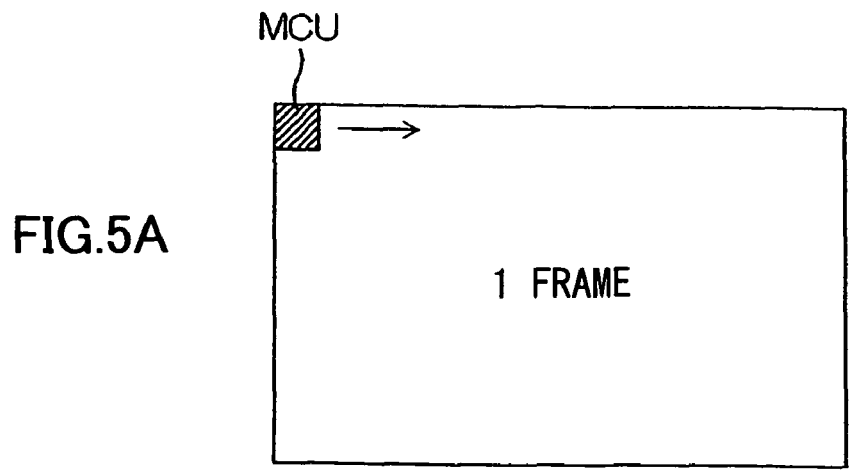
FIGS. 5A to 5C are diagrams showing a structure of an MCU.

As shown in FIG. 5A, image data for a frame is scanned for each MCU from the upper left to the upper right of a frame, compressed for each MCU and recorded in order.

Figure 5B:
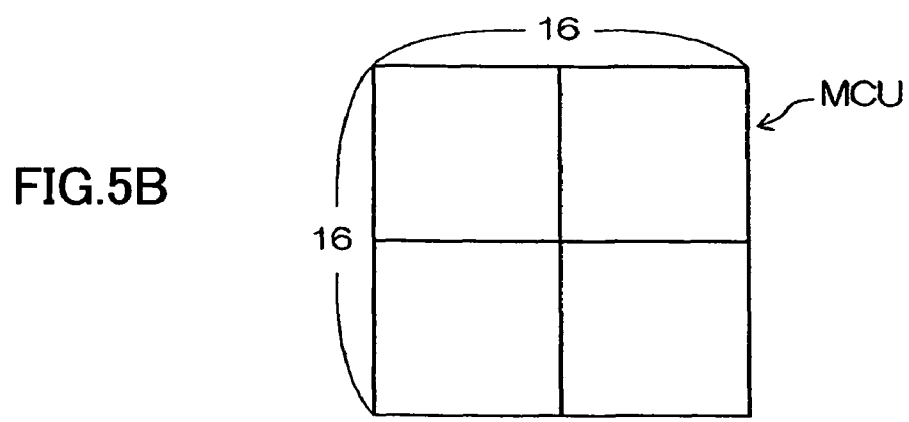
Figure 5C:
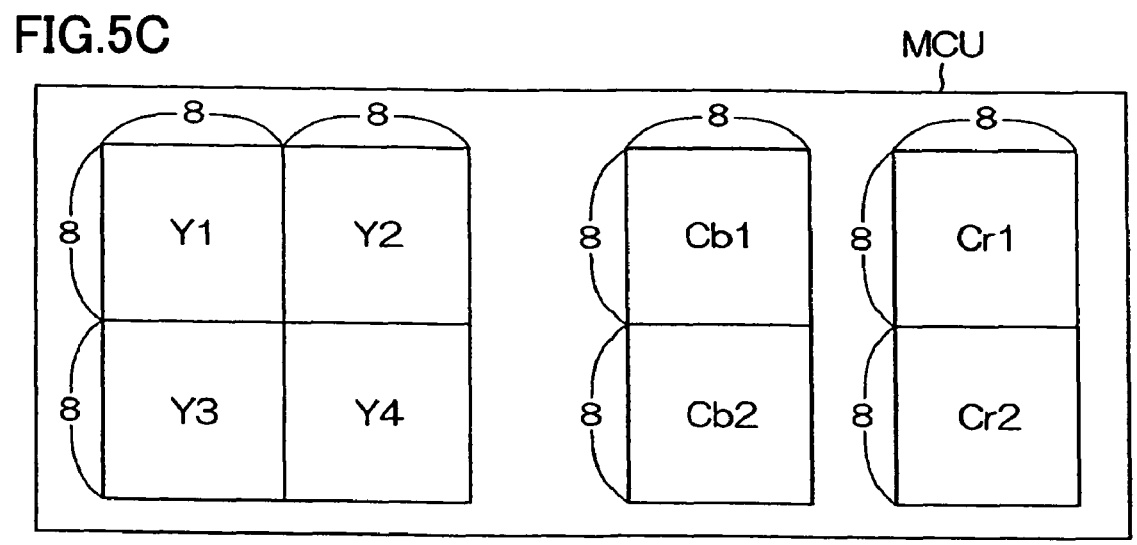

The MCU has 16×16 pixels as the minimum unit for coding as shown in FIG. 5B and the size of the discrete cosine transform (DCT) is 8×8, thus, as shown in FIG. 5C, the brightness data Y is divided into four blocks Y1, Y2, Y3, and Y4 and the pieces of color difference data Cr and Cb are divided into two blocks Cr1 and Cr2, and Cb1 and Cb2, respectively.

The block of 8×8 pixels is subject to two-dimensional DCT, the DCT coefficient is subtracted by each element of the quantization table and the reminder is rounded. The DCT coefficient quantized in such a manner is coded in the Huffman coding defining table (codes are allocated according to a probability of appearance of the codes).

Then, an alternative value (AC value) is recorded following to the top value of each block (a direct value (DC value) indicating a light-dark level on the entire block) as shown in FIG. 4. Because, the DC values of adjacent blocks are close to each other; a difference value with a DC component in the block immediately before is generally recorded.

A restart interval marker (RIT) is recorded for each MCU as shown in FIG. 4. The DC value immediately after the restart interval marker is recorded by its absolute value.

The image format shown in FIG. 5C decreases the amount of data of the color difference data Cr and Cb forming a pixel to half in the horizontal direction respectively to make them in a ratio of 4:2:2 where Y=4, Cr=2, Cb=2. It uses the fact that human eyes are not so sensitive to colors and do not sense lowering quality of the image even if the color information is reduced to half. There are 4:2:0 (4:1:1), 4:4:4 (1:1:1) formats other than the 4:2:2 format shown in FIG. 5C but the present invention can be applied to any format.

Returning to FIG. 3, a part of JPEG data received by the communication I/F 21-2 is temporally saved in a work memory 53. When the header part is saved in the work memory 53, the CPU 52 analyzes header information and sets at least the resolution in the main-scanning/sub-scanning direction, the number of color components, a sampling factor (SF) for each color, a quantization table for each color (IQNT), a Huffman coding definition table for each color (DHT), and a resizing ratio in a JPEG decompressing block 54. The resizing ratio can be obtained from the image size of the JPEG data to be inputted via the communication I/F 21-2 and the image size of the outputted image to be outputted to the printing unit.

When the data temporally saved in the work memory 53 has been analyzed, the CPU 52 deletes the data from the work memory 53 in order and save the data in the work memory 53. When processing on the header information ends, the operation proceeds to the next step.

Following to the information of the header part, scanning data is transferred from the communication I/F 21-2. The scanning data is also temporally saved in the work memory 53. The CPU 52 transfers the data from the work memory 53 to the JPEG decompressing block 54. Here, a DMA (Direct Memory Access) may be set so that the DMA transfers the data in order to reduce the load on the CPU 52.

In response to a JPEG decompressing start signal a from the CPU 52, the JPEG decompressing block 54 starts the decompression. In response to a JPEG decompressing ack signal b from the JPEG decompressing block 54, the CPU 52 transfers the data temporally saved in the work memory 53 to the work memory load signal i. In processing or printing the data, the CPU 52 transfers data saved in a flash ROM 60 by a flash load signal k.

In the JPEG decompressing block 54, the compressed data subject to the JPEG compression is decompressed based on the resolution in the main scanning/sub-scanning direction, the number of color components, the sampling factor (SF) for each color, the quantization table (IQNT) for each color, the Huffman coding definition table (DHT) for each color sent from the CPU 52.

The JPEG decompressing block 54 keeps decompression until the decompression by the unit of MCU completes, and when it determines that the decompression by the unit of MCU completes, it sends an MCU decompression completion signal c to the CPU 52. When the CPU 52 receives the MCU decompression completion signal c, it outputs a decompression waiting signal d to the JPEG decompressing block 54 to stop the operation of the JPEG decompressing block 54.

The CPU 52 determines whether decompression of an image for a frame completes or not, and if it does not complete, it starts decompressing the next MCU.

The flash ROM 60 stores compressed data for a frame divided into MCUs (blocks) by M lines and M columns, but is adapted to read the compressed data of each block in any order in photographic printing.

Therefore, when the compressed data stored in the flash ROM 60 is decompressed in photographic printing, the compressed data is read out by a flash load signal k based on address information indicating a memory region where the compressed data in the block to be decompressed is saved and the compressed data is transferred.

The loss detecting unit 52a, which is one of the programs executed by the CPU 52, is stored in the flash ROM 60 and the other nonvolatile storage media. The CPU 52 detects a data loss included in the image data of the decompressed data buffer 55 by interpreting and executing the loss detecting unit 52a. Specifically, the CPU 52 detects the data loss by detecting occurrence of a bit error in the JPEG data or the presence or absence of a restart marker.

Figure 6A:
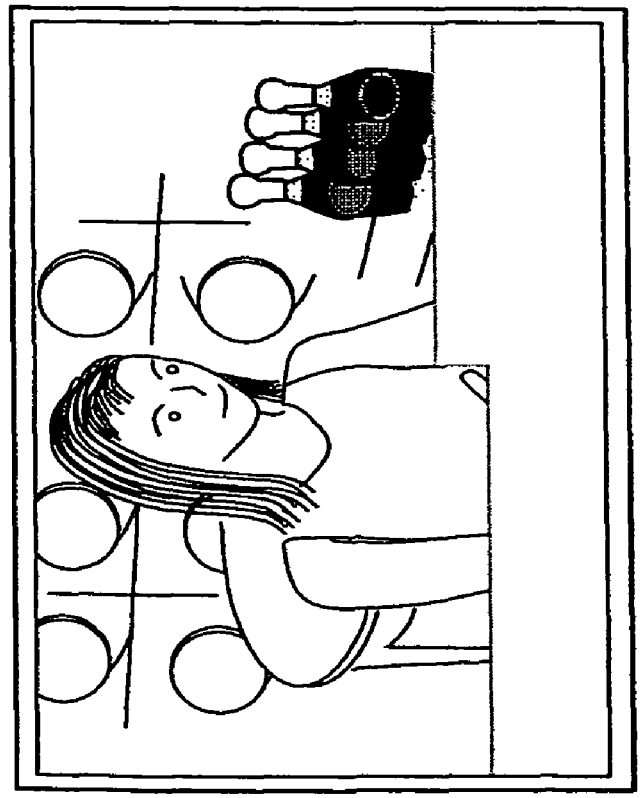
FIGS. 6A and 6B are diagrams showing an example of a preview display of an image data with a loss.

The output from a print image creating/displaying unit 35 changes depending on whether the loss detecting unit 52a detects the restart marker in the image data or not. If there is a data loss due to a bit error in a JPEG compressed image data and also a loss of a restart maker, the place for separating a code is mistaken or a way to separate the code is not known in coding. Thus, image data after the bit error cannot be decoded (displayed) as shown in a preview display shown in FIG. 6A.

When the loss detecting unit 52a cannot detect a restart marker from image data, the CPU 52 controls the light-emitting device 19 to light or flash to inform the user that there is a loss.

Figure 6B:
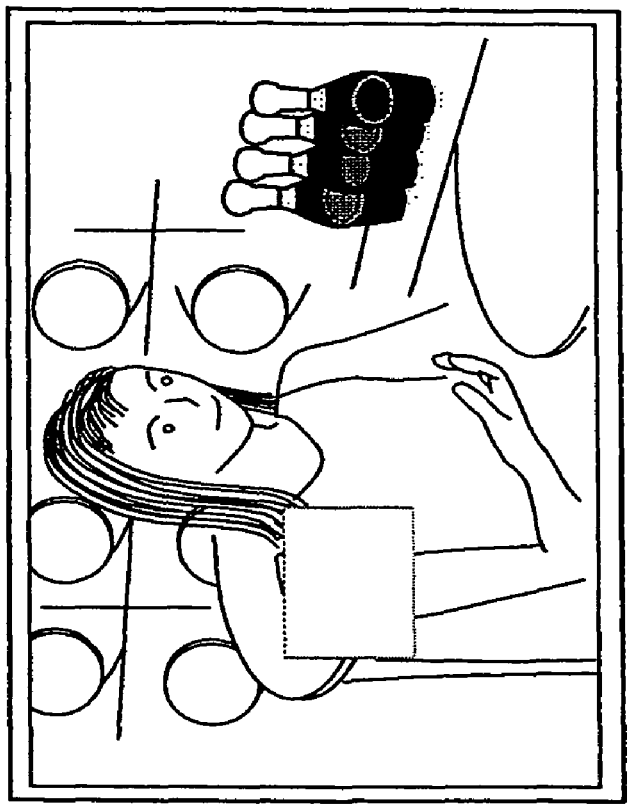

On the other hand, when the loss detecting unit 52a detects a restart marker in the image data including a data loss, an image quality degrades only in the data lost part as shown in the preview display shown in FIG. 6B, thus, no failure occurs in data thereafter. In such a case, degradation of the image quality is relatively slight. When the presence of such a loss needs to be informed to the user, the light-emitting device 19 preferably lit or flashed.

A device which informs of a loss in image data needs not to be limited to the light-emitting device 19 such as a LED, and may be an OSD circuit for combining a predetermined character message or a predetermined icon with a preview image of the display device 18, a speaker for playing a predetermined message or an alarm sound, or the like.

Figure 7:
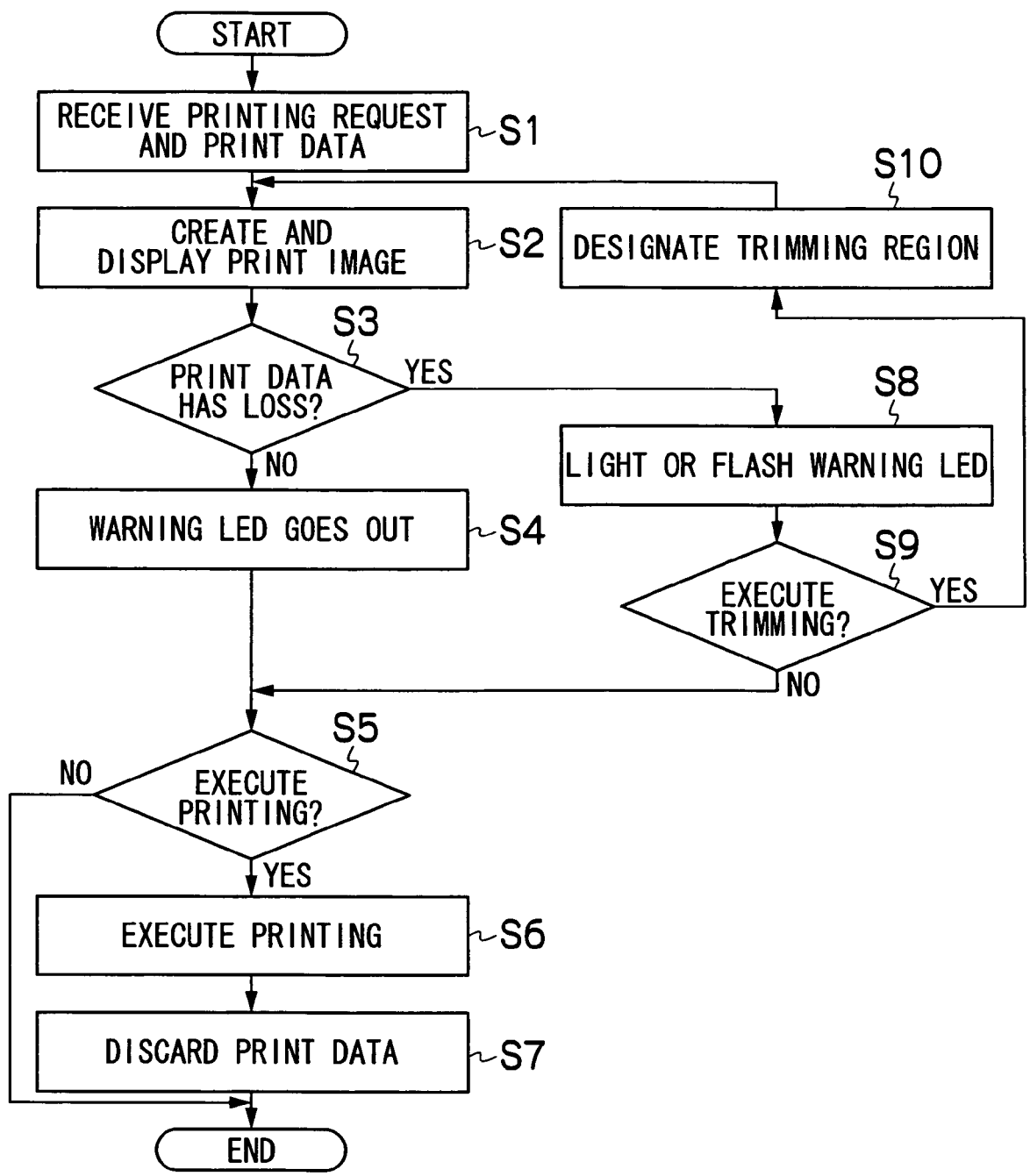
FIG. 7 is a flowchart showing a flow of an operation of a printer according to the first embodiment.

An operation of the printer 200 according to the preferred first embodiment of the present invention will be described with reference to FIG. 7.

First, via the communication I/F 21-2, a printing request and print data including various kinds of data that can be interpreted by the CPU 52 as an object of printing such as image data or text data to be printed, which are sent from an external communication terminal such as the cellular phone 100, are received (S1). When the CPU 52 recognizes the printing request, it stores the print data such as the received image data into the work memory 53.

The print image creating/displaying unit 35 displays a print image (preview image) that is assumed to be a state of the received image data printed on the printing medium on the display device 18 based on image data stored in the work memory 53 (S2). An example of the preview display is shown in FIG. 6.

The data loss detecting unit 52a determines the presence or the absence of a loss in image data stored in the work memory 53 (S3). As a criterion of determining the loss, the criterion below may be used other than the presence or the absence of the loss detection such as a restart marker as mentioned above. An external communication terminal such as the cellular phone 100 previously inserts recorded pixels information (for example, 640×480 pixels) of an image in the header part of the image packet, and the CPU 52 compares the recorded pixels information read from the header part and the number of pixels of the image data stored in the decompressed data buffer 55. If they match, it determines that no loss occurs; and if they do not match, it determines that a loss occurs.

If the data loss detecting unit 52a determines that there is no loss in the image data, the CPU 52 sends a control signal to stop lighting or flashing of the light-emitting device 19 (S4).

The CPU 52 determines whether the print button 16 is pressed or the cancel button 17 is pressed (S5). If it determines that the print button 16 is pressed ("YES" at S5), the CPU 52 sends the image data in the buffer 58 to the printer unit 20 and causes the photographic printing to be performed (S6). After the photographic printing has executed, the image data in the buffer 58 is discarded (S7).

If the CPU 52 determines that the cancel button 17 is pressed ("NO" at S5), it immediately discards the image data in the buffer 58 (S7).

On the other hand, if the data loss detecting unit 52a determines that there is a loss in image data, the CPU 52 sends a control signal to start lighting or flashing of the light-emitting device 19 (S8). The user can recognize that there is a loss in the image received by the printer 200 by viewing lighting or flashing of the light-emitting device 19.

The CPU 52 determines whether a trimming region is designated or not according to the operation on the directional key 14 and/or the zooming up/down buttons 15 (S9).

If it is determined that a trimming region is designated ("YES" at S9), the print image creating/displaying unit 35 cuts out the image data in the designated trimming region and stores the cut out image as trimmed image data (S10). The print image creating/displaying unit 35 creates a preview image of the trimmed image data and causes the display device 18 to display the preview image (S2).

If it is not determined that no trimming region is designated ("NO" at S9), the CPU 52 further determines whether the print button 16 is pressed or the cancel button 17 is pressed (S5). In response to the pressing of the print button 16 ("YES" at S15), the trimmed image data is sent to the printer unit 20 (S6).

If the cancel button 17 is pressed ("NO" at S5), the trimmed image data in the buffer 58 is discarded.

Figure 8:
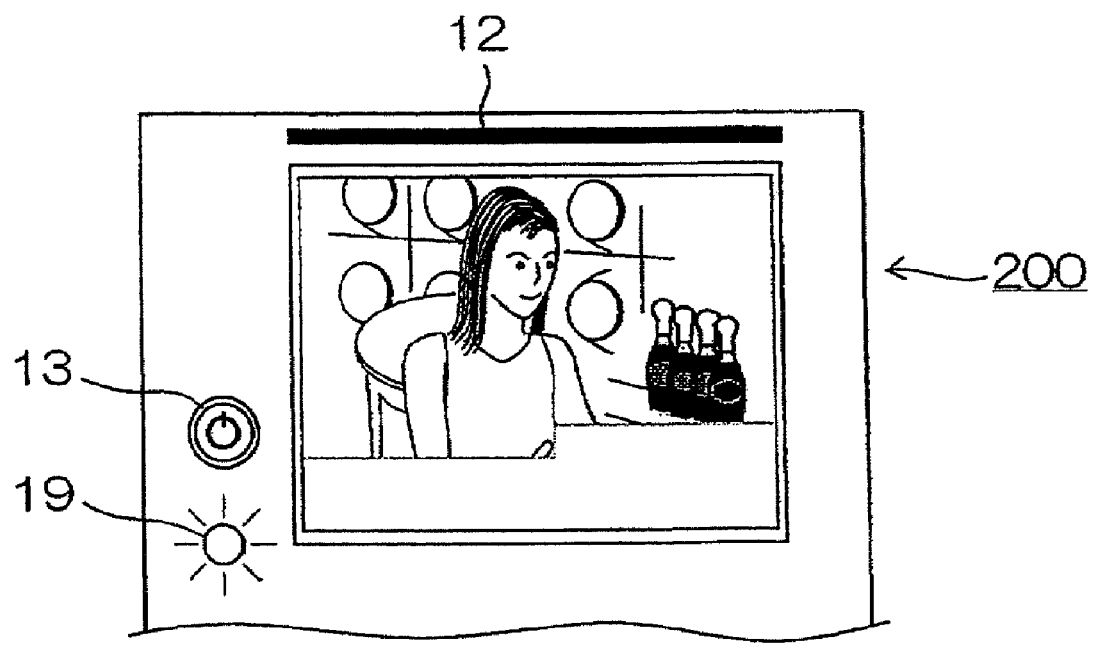
FIG. 8 is a diagram showing a state where a preview of an image data with a loss is displayed with the light-emitting device being lit.

FIG. 8 shows a state where a preview of an image data with a loss is displayed at the bottom of the image with the light-emitting device 19 being lit. As in the preview display, even with image data with a loss at a bottom of the image, there is no loss in an important part in the image data (here, a face of the main object). Thus, the image data may be sufficient to be viewed if only the lost part is removed. In such a case where it is not permitted to resend an image due to the copyright protection, it is desirable to print the image data whose lost part is removed.

Figure 9:
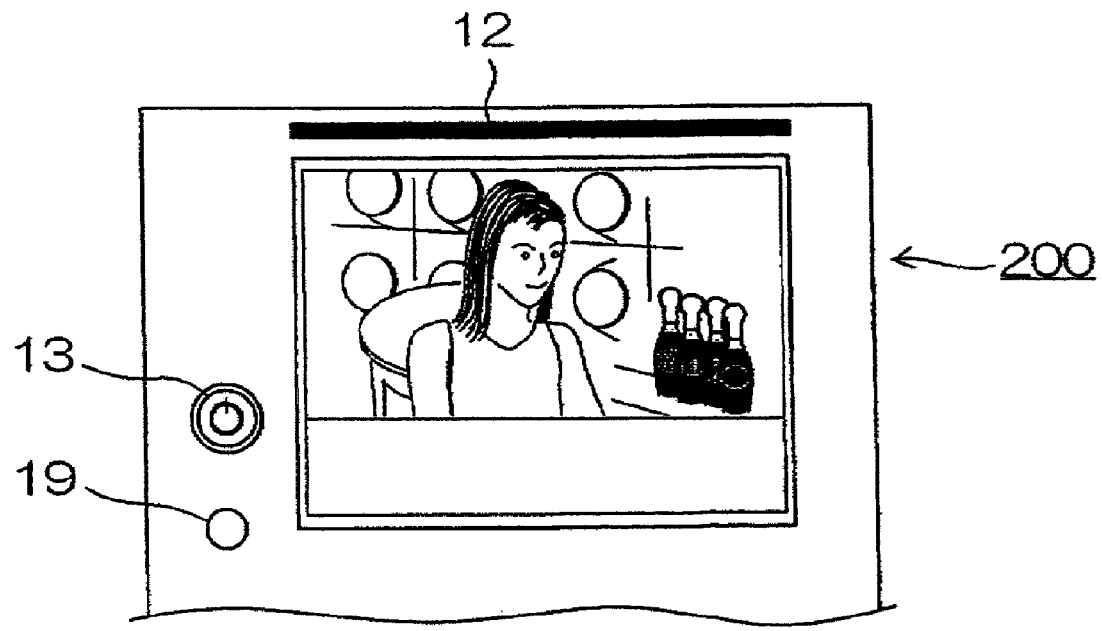
FIG. 9 is a diagram showing a state where a preview of an image in a rectangular trimming region, in which a lost part at the bottom of the image is designated to be removed, is displayed with a light-emitting device going out.

FIG. 9 shows a state where a preview of an image in a rectangular trimming region, in which a lost part at the bottom of the image is designated to be removed, is displayed with a light-emitting device 19 going out. If the loss can be successfully removed by trimming, the light-emitting device 19 goes out with a preview of the actually trimmed image being also displayed, thus, a user can easily check how it is trimmed.

As such, in the printer 200 of the embodiment, even if the received image data has a slight loss, the lost part can be removed by trimming to make it to be printed to help a user who failed in sending a complete image.

If the user likes the trimmed image, the user can print it; or if the user does not like the trimmed image, the user can print the original image before trimming or give up to print the image.

Second Embodiment

Figure 10:
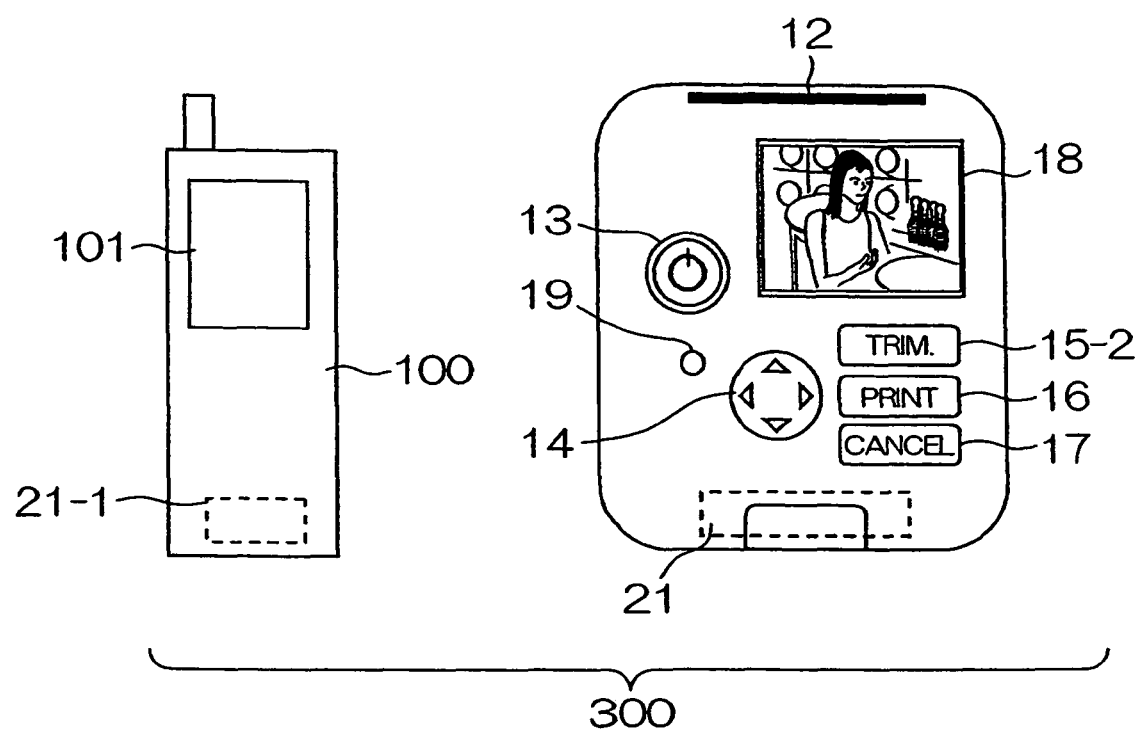
FIG. 10 is a diagram showing an appearance of the print system according to the second embodiment.

FIG. 10 shows an appearance of the printer 200 and the print system 300 according to the preferred second embodiment of the present invention. The printer 200 has no zooming up/down button 15-1 of the first embodiment but has a trimming button 15-2 instead. The directional key 14 is not necessary and the printer 200 does not need to have it. The inside blocks of the printer 200 are also the same as those shown in FIG. 2 except for the trimming button 15-2, thus, the description of them will be omitted.

Figure 11:
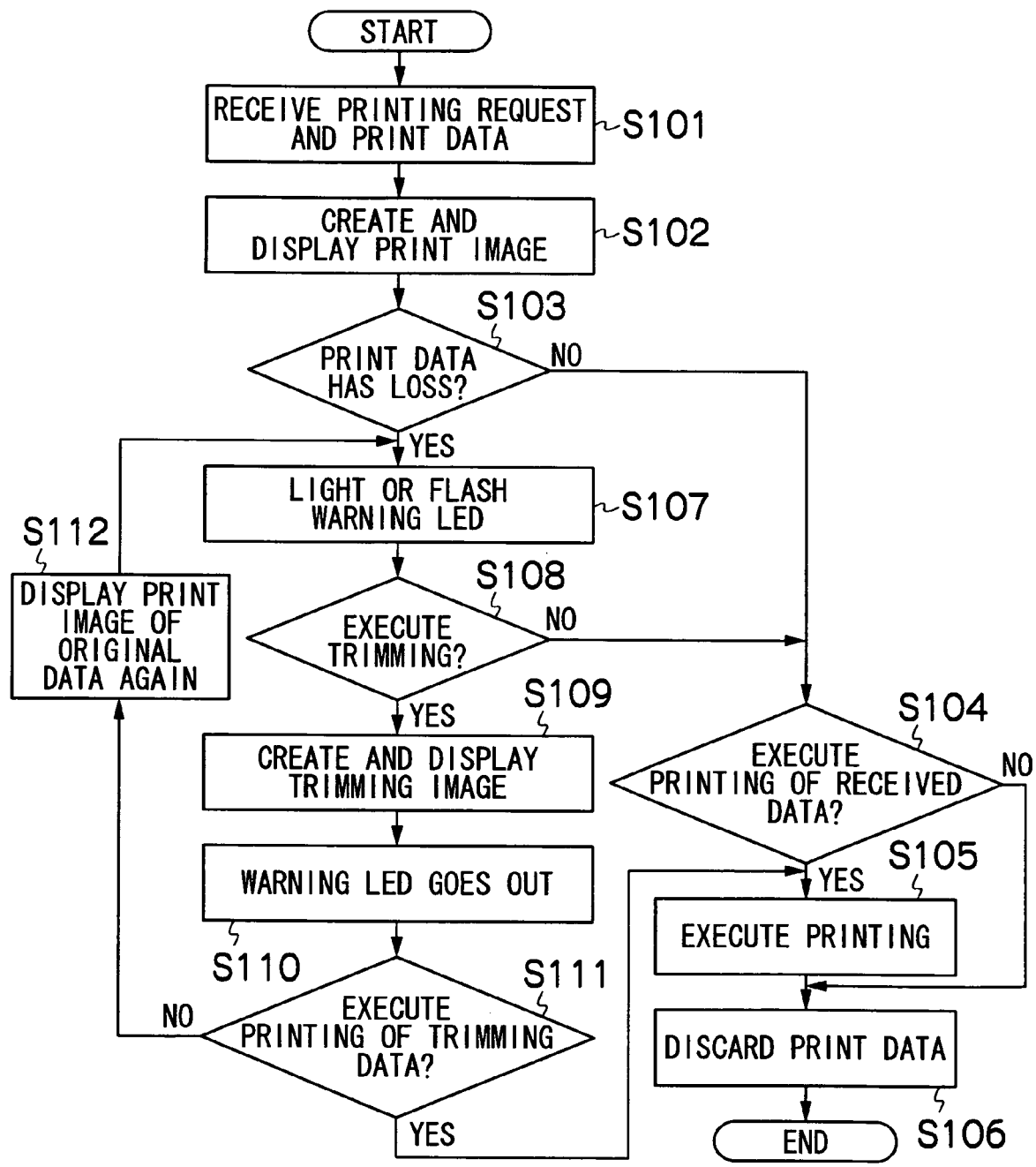
FIG. 11 is a flowchart showing a flow of an operation of a printer according to the second embodiment.

An operation of the printer 200 according to the preferred second embodiment of the present invention will be described with reference to FIG. 11.

First, via the communication I/F 21-2, a printing request and print data including various kinds of data that can be interpreted by the CPU 52 as an object of printing such as image data or text data to be printed, which are sent from the cellular phone 100, are received (S101). When the CPU 52 recognizes the printing request, it stores the print data such as the received image data into the work memory 53.

The print image creating/displaying unit 35 creates a print image (preview image) that is assumed to be a state of the image data printed on the printing medium and displays it on the display device 18 based on image data stored in the work memory 53 (S102). An example of the preview display is shown in FIG. 6.

The data loss detecting unit 52a determines the presence or the absence of a loss in image data stored in the work memory 53 (S103).

If the data loss detecting unit 52a determines that there is no loss in image data, the CPU 52 further determines whether the print button 16 is pressed or the cancel button 17 is pressed (S104). If it is determined that the print button 16 is pressed, the CPU 52 sends the image data in the buffer 58 to the printer unit 20 to execute the photographic printing (S105). After the photographic printing has been executed or after the cancel button 17 is pressed, the image data in the buffer 58 is discarded (S106).

On the other hand, if the data loss detecting unit 52a determines that there is a loss in the image data, the CPU 52 sends a control signal to light or flash the light-emitting device 19 (S107).

If the user determines that the lost part of a print can be avoided even if the image data with a loss is not subject to trimming, the user presses the cancel button 17. If the user determines that the lost part of a print can be avoided if the image data with a loss is subject to trimming, the user presses the trimming button 15. The CPU 52 determines whether the cancel button 17 is pressed or the trimming button 15 is pressed (S108).

If it is determined that the trimming button 15 is pressed ("YES" at S108), the CPU 52 decides a trimming region so that the lost part of the print is removed. The CPU 52 preferably decides a rectangular trimming region so that an area to be removed from the original image data is the minimum.

The print image creating/displaying unit 35 stores image data in the trimming region decided by the CPU 52 into the buffer 58 as trimmed image data, creates its preview image and causes the display device 18 to display the preview image (S109).

When a preview display of the trimmed image data is executed, the light-emitting device 19 stops lighting or flashing (S110).

If the image data (trimmed image data) in the trimming region automatically decided by the CPU 52 is sufficient to the user, the user presses the print button 16. If the user does not like the trimmed image data, the user presses the cancel button 17. The CPU 52 determines whether the print button 16 is pressed or the cancel button 17 is pressed (S111).

If the CPU 52 determines that the print button 16 is pressed ("YES" at S111), it sends the image data in the buffer 58 to the printer unit 20 and causes photographic printing to be executed (S105). After the photographic printing has been executed, the image data in the buffer 58 is discarded (S106).

If the CPU 52 determines that the cancel button 17 is pressed ("NO" at S111), it discards the trimmed image data from the buffer 58. The print image creating/displaying unit 35 displays a preview of a print image of the image data with a loss stored in the work memory 53 onto the display device 18 (S112). Then the operation returns to S107, and the presence of the loss in the image is informed again by, for example, lighting or flashing of the light-emitting device 19.

If the cancel button 17 is pressed based on user's determination of that the user does not need to trim the image even if there is a loss ("YES" at S103 and "NO" at S108), the operation proceeds to S104, where image data is sent to the printer unit 20 in response to pressing of the print button 16.

As such, in the printer 200 of this embodiment, if a received image data has a slight loss, the lost part is automatically removed by trimming in a range decided by the CPU 52. If the user likes the trimmed image, the user can print it; and if the user does not like the trimmed image, the user can print the original image before trimming or give up to print the image.

Other Embodiments

At S9 of the first embodiment and at S108 of the second embodiment, trimming is executed in response to pressing of the zooming up/down button 15-1 or the trimming button 15-2; but the CPU 52 may determine whether the lost part of a print can be avoided without trimming the image data with a loss or the lost part of a print can be avoided with trimming the image data with a loss, and if it is determined that the lost part of the print can be avoided with trimming the image data with a loss, it may execute the trimming.

Specifically, at S9 of the first embodiment, it is determined that the lost part can be avoided without trimming i.e., no trimming is needed, if the size of the lost part is less than a predetermined first size (for example, several pixels), and the operation proceeds to S5. If the position of the loss in the image data is at the edge of the image and the size of the lost part is less than a predetermined second size (for example, tens of pixels), it is determined that the lost part can be avoided if the image is trimmed, i.e., that the trimming is needed, and the operation proceeds to S10.

Similarly, at S1108 of the second embodiment, it is determined that the size of the lost part is less than the predetermined first size (for example, several pixels), the lost part can be avoided without trimming, and the operation proceeds to S104. If the position of the lost part in the image data is at the edge of the image and the size of the lost part is less than the predetermined second size (for example, tens of pixels), it is determined that the lost part can be avoided if the image is trimmed, and the operation proceeds to S109.

If the size of the lost part is the predetermined second size or more and if the position of the lost part is other than the edge of the image (a center of an image or the like), it is determined that the lost part cannot be avoided even if the image is trimmed (i.e., even the trimmed image data is printed, it is not sufficient to be viewed), thus, the image data in the buffer 58 can be discarded.

If it is determined that the lost part of the print can be avoided without trimming the image data with a loss, the CPU 52 can recover the lost part by using various recovering processes (for example, a method for interpolating a signal value of a pixel with a data loss by using signal values of adjoining pixels or data interpolation by cubic-spline interpolation calculation or the like).

What is claimed is:

1. A printer comprising:
a receiving unit for receiving an image from an external communication terminal;
a display unit for creating a print image of the image received by the receiving unit and displaying a preview of the print image;
a printing unit for printing the image received by the receiving unit;
a loss detecting unit for detecting a loss of a part of the image received by the receiving unit and displayed by the display unit as the preview of the print image, and supplying a warning notification to an operator upon detecting the loss of the part of the image; and
a trimming unit for determining whether or not the operator has input a trimming region for the print image so that a lost part of the print image is designated to be removed by trimming after the loss has been detected by the loss detecting unit and the warning notification has been supplied, wherein
when the trimming unit determines that a trimming region has been designated, the trimming unit supplies the designated trimming region to the display unit that uses the designated trim region to create a trimmed print image obtained as a result of the designated trimming region being trimmed and displays a preview of the trimmed print image with the warning notification being removed, and
the printing unit prints the trimmed print image when instructed to do so by a print command input from the operator.

2. The printer according to claim 1, further comprising an instruction inputting unit for accepting input of an instruction by the operator,
wherein the trimming unit trims an image in an instructed range when an instruction for the trimming unit to execute the trimming and an instruction indicating a range of trimming are inputted in the instruction inputting unit by the operator, and
the printing unit prints the trimmed print image when an instruction for printing the trimmed print image is inputted by the operator through the instruction inputting unit.

3. The printer according to claim 2
wherein the printing unit prints the image received by the receiving unit when an instruction for not executing the trimming by the trimming unit is inputted by the instruction inputting unit and an instruction for printing the image received by the receiving unit is inputted by the instruction inputting unit.

4. The printer according to claim 3,
wherein the printing unit discards the image received by the receiving unit when an instruction for not executing the trimming by the trimming unit is inputted by the instruction inputting unit and an instruction for not printing the image received by the receiving unit is inputted by the instruction inputting unit.

5. The printer according to claim 2,
wherein the printing unit discards the image received by the receiving unit when an instruction for not executing the trimming by the trimming unit is inputted by the instruction inputting unit and an instruction for not printing the image received by the receiving unit is inputted by the instruction inputting unit.

6. The printer according to claim 2, further comprising an informing unit for informing the presence of a loss in the image by supplying the warning notification to the operator when the loss detecting unit detects the loss in the image.

7. The printer according to claim 6, wherein information of the presence of a loss in the image from the informing unit includes at least one of lighting or flashing of a light-emitting device, displaying of a predetermined message or a predetermined icon by the display device, and playing a predetermined voice by a voice playing device.

8. The printer according to claim 7,
wherein the loss detecting unit detects a loss in the trimmed print image, and
the informing unit informs the absence of a loss in the trimmed print image by the warning notification being removed when the loss detecting unit does not detect the loss in the trimmed print image.

9. The printer according to claim 8,
wherein the information on the absence of a loss in the image from the informing unit includes at least one of: stopping of lighting or flashing of a lighting-emitting device, displaying of a predetermined message or a predetermined icon by the display device, and playing of a predetermined voice by the voice playing device.

10. The printer according to claim 6,
wherein the loss detecting unit detects a loss in the trimmed print image, and
the informing unit informs the absence of a loss in the trimmed print image by the warning notification being removed when the loss detecting unit does not detect the loss in the trimmed print image.

11. The printer according to claim 10,
wherein the information on the absence of a loss in the image from the informing unit includes at least one of: stopping of lighting or flashing of a lighting-emitting device, displaying of a predetermined message or a predetermined icon by the display device, and playing of a predetermined voice by the voice playing device.

12. The printer according to claim 1, further comprising an instruction inputting unit for accepting input of an instruction by the operator,
wherein the printing unit prints the image received by the receiving unit when an instruction for not executing the trimming by the trimming unit is inputted by the instruction inputting unit and an instruction for printing the image received by the receiving unit is inputted by the instruction inputting unit.

13. The printer according to claim 12,
wherein the printing unit discards the image received by the receiving unit when an instruction for not executing the trimming by the trimming unit is inputted by the instruction inputting unit and an instruction for not printing the image received by the receiving unit is inputted by the instruction inputting unit.

14. The printer according to claim 1, further comprising an instruction inputting unit for accepting input of an instruction by the operator,
wherein the printing unit discards the image received by the receiving unit when an instruction for not executing the trimming by the trimming unit is inputted by the instruction inputting unit and an instruction for not printing the image received by the receiving unit is inputted by the instruction inputting unit.

15. The printer according to claim 1, further comprising an informing unit for informing the presence of a loss in the image by supplying the warning notification to the operator when the loss detecting unit detects the loss in the image.

16. The printer according to claim 15, wherein information of the presence of a loss in the image from the informing unit includes at least one of lighting or flashing of a light-emitting device, displaying of a predetermined message or a predetermined icon by the display device, and playing a predetermined voice by a voice playing device.

17. The printer according to claim 16,
wherein the loss detecting unit detects a loss in the trimmed print image, and
the informing unit informs the absence of a loss in the trimmed print image by the warning notification being removed when the loss detecting unit does not detect the loss in the trimmed print image.

18. The printer according to claim 17,
wherein the information on the absence of a loss in the image from the informing unit includes at least one of: stopping of lighting or flashing of a lighting-emitting device, displaying of a predetermined message or a predetermined icon by the display device, and playing of a predetermined voice by the voice playing device.

19. The printer according to claim 15,
wherein the loss detecting unit detects a loss in the trimmed print image, and
the informing unit informs the absence of a loss in the trimmed print image by the warning notification being removed when the loss detecting unit does not detect the loss in the trimmed print image.

20. The printer according to claim 19,
wherein the information on the absence of a loss in the image from the informing unit includes at least one of: stopping of lighting or flashing of a lighting-emitting device, displaying of a predetermined message or a predetermined icon by the display device, and playing of a predetermined voice by the voice playing device.

21. A printing method used in a printer, said printer including a receiving unit for receiving an image from an external communication terminal, a displaying unit for creating a print image of the image received by the receiving unit and displaying a preview of the print image, and a printing unit for printing an image received by the receiving unit, the method comprising the steps of:
creating a print image of the image received by the receiving unit and displaying a preview of the print image on the display unit;
detecting a loss of a part of the print image;
supplying a warning notification to an operator when the loss of the part of the print image is detected;
designating a trimming region for trimming a part of the print image corresponding to the loss of the part of the print image in response to an operator input after the loss of the part of the print image is detected and the warning notification has been supplied;
creating a trimmed print image as a result of the designated trimming region and displaying the trimmed print image on the displaying unit while removing the warning notification; and
printing the trimmed print image using the printing unit when instructed to do so by a print command input from the operator.

22. A non-transitory computer readable storage medium storing a printing program for a printer, said printer including a receiving unit for receiving an image from an external communication terminal, a displaying unit for creating a print image of the image received by the receiving unit and displaying a preview of the print image, and a printing unit for printing the image received by the receiving unit, the printing program causing the printer to execute the steps of:
creating a print image of the image received by the receiving unit and displaying a preview of the print image on the display unit;
detecting a loss of a part of the print image;
supplying a warning notification to an operator when the loss of the part of the print image is detected;
designating a trimming region for trimming a part of the print image corresponding to the loss of the part of the print image in response to an operator input after the loss of the part of the print image is detected and the warning notification has been supplied;
creating a trimmed print image as a result of the designated trimming region and displaying the trimmed print image on the displaying unit while removing the warning notification; and
printing the trimmed print image using the printing unit when instructed to do so by a print command input from the operator.

* * * * *